United States Patent
Schönhuber et al.

(10) Patent No.: US 11,104,233 B2
(45) Date of Patent: Aug. 31, 2021

(54) METHOD FOR DETERMINING PREDICTED ACCELERATION INFORMATION IN AN ELECTRIC VEHICLE AND SUCH AN ELECTRIC VEHICLE

(71) Applicant: AUDI AG, Ingolstadt (DE)

(72) Inventors: Christian Schönhuber, Ingolstadt (DE); Johann Knöferl, Schrobenhausen (DE)

(73) Assignee: AUDI AG, Ingolstadt (DE)

( * ) Notice: Subject to any disclaimer, the term of this patent is extended or adjusted under 35 U.S.C. 154(b) by 98 days.

(21) Appl. No.: 16/374,927

(22) Filed: Apr. 4, 2019

(65) Prior Publication Data
US 2019/0337399 A1    Nov. 7, 2019

(30) Foreign Application Priority Data

May 7, 2018   (DE) ..................... 10 2018 207 006.7

(51) Int. Cl.
 *B60L 15/20*   (2006.01)
 *B60W 50/00*   (2006.01)
 *G01C 21/34*   (2006.01)

(52) U.S. Cl.
 CPC ..... *B60L 15/2072* (2013.01); *B60W 50/0097* (2013.01); *G01C 21/34* (2013.01);
 (Continued)

(58) Field of Classification Search
 CPC .. B60L 15/20; B60L 15/2045; B60L 15/2072; B60L 2240/14; B60L 2240/16;
 (Continued)

(56) References Cited

U.S. PATENT DOCUMENTS

| | | | | |
|---|---|---|---|---|
| 5,453,930 A | * | 9/1995 | Imaseki | B60L 15/20 701/22 |
| 5,919,240 A | * | 7/1999 | Ney | B60G 21/06 701/37 |

(Continued)

FOREIGN PATENT DOCUMENTS

| | | |
|---|---|---|
| DE | 10 2008 015 567 A1 | 10/2008 |
| DE | 10 2011 005 107 A1 | 10/2011 |

(Continued)

OTHER PUBLICATIONS

European Search Report dated Oct. 9, 2019, in connection with corresponding EP Application No. 19164808.8 (10 pgs., including machine-generated English translation).

(Continued)

*Primary Examiner* — Babar Sarwar
(74) *Attorney, Agent, or Firm* — Maier & Maier, PLLC

(57) ABSTRACT

Method for determining predicted acceleration information which describes a future acceleration potential of an electric vehicle having an electric motor as the drive device, which is supplied with electric power from a battery in the electric vehicle, this method including the following steps: —Supplying power predictive information of the electric motor, which describes the predicted available acceleration power of the electric motor for at least one future period of time, —Determining the acceleration information from the power predictive information by using a vehicle model which supplies the prevailing operating state of the electric vehicle, at least one vehicle parameter describing the acceleration possible on the basis of the acceleration power and/or using predictive path data supplied in particular by a navigation system for the period of time.

6 Claims, 1 Drawing Sheet

(52) U.S. Cl.
CPC ..... *B60L 2240/16* (2013.01); *B60L 2240/465* (2013.01); *B60L 2240/545* (2013.01); *B60L 2240/662* (2013.01); *B60W 2510/244* (2013.01); *B60W 2510/246* (2013.01); *B60W 2520/26* (2013.01); *B60W 2530/10* (2013.01); *B60W 2552/15* (2020.02); *B60W 2552/30* (2020.02); *B60W 2552/40* (2020.02); *B60W 2555/20* (2020.02); *B60W 2720/106* (2013.01); *B60Y 2200/91* (2013.01); *B60Y 2300/18025* (2013.01)

(58) Field of Classification Search
CPC ......... B60L 2240/421; B60L 2240/423; B60L 2240/425; B60L 2240/465; B60L 2240/525; B60L 2240/545; B60L 2240/547; B60L 2240/549; B60L 2240/60; B60L 2240/662; B60L 2260/50; B60W 2510/244; B60W 2510/246; B60W 2510/248; B60W 2520/26; B60W 2530/10; B60W 2552/15; B60W 2552/20; B60W 2552/30; B60W 2552/40; B60W 2555/20; B60W 2556/50; B60W 2720/106; B60W 50/0097; B60Y 2200/91; B60Y 2300/18025; G01C 21/34
See application file for complete search history.

(56) References Cited

U.S. PATENT DOCUMENTS

| | | | | |
|---|---|---|---|---|
| 6,269,290 | B1* | 7/2001 | Egami | B60K 6/26 701/22 |
| 7,987,934 | B2* | 8/2011 | Huseman | B60W 20/00 180/65.21 |
| 8,392,087 | B2* | 3/2013 | Kodama | B60W 30/18027 701/75 |
| 10,384,669 | B2* | 8/2019 | Cho | B60T 8/176 |
| 2008/0236921 | A1* | 10/2008 | Huseman | B60W 20/00 180/165 |
| 2013/0138286 | A1* | 5/2013 | Sawayama | B60L 58/24 701/22 |
| 2014/0046525 | A1* | 2/2014 | Lee | B60W 10/11 701/22 |
| 2014/0309832 | A1* | 10/2014 | Ando | B60W 10/08 701/22 |
| 2015/0072831 | A1* | 3/2015 | Sakata | B60K 6/547 477/5 |
| 2015/0266390 | A1* | 9/2015 | Shin | B60L 3/12 701/22 |
| 2015/0367841 | A1* | 12/2015 | Takahashi | B60L 50/16 701/22 |
| 2018/0162352 | A1* | 6/2018 | Lee | B60W 20/12 |
| 2018/0162367 | A1* | 6/2018 | Oh | B60W 10/08 |

FOREIGN PATENT DOCUMENTS

| | | |
|---|---|---|
| DE | 10 2011 116 773 A1 | 12/2012 |
| DE | 10 2011 116 184 A1 | 4/2013 |
| DE | 10 2013 110 346 A1 | 4/2014 |
| DE | 10 2014 224 758 A1 | 6/2015 |
| DE | 10 2014 012 318 A1 | 3/2016 |
| DE | 10 2016 209 848 A1 | 12/2016 |
| DE | 10 2016 123 648 A1 | 6/2017 |
| DE | 10 2016 212 071 A1 | 1/2018 |
| EP | 2 055 597 A2 | 5/2009 |

OTHER PUBLICATIONS

Examination Report dated Sep. 26, 2018 of corresponding German application No. 10 2018 207 006.7; 12 pages.

European Office Action dated Oct. 20, 2020, in connection with corresponding EP Application No. 19 164 808.8 (13 pgs., including machine-generated English translation).

Examination Report dated Jun. 10, 2021 in corresponding European Application No. 19 164 808.8; 14 pages including English-language translation.

* cited by examiner

METHOD FOR DETERMINING PREDICTED ACCELERATION INFORMATION IN AN ELECTRIC VEHICLE AND SUCH AN ELECTRIC VEHICLE

FIELD

The disclosure relates to a method for determining predicted acceleration information describing a future acceleration potential of an electric vehicle having an electric motor as a drive device supplied with electric power by a battery in the electric vehicle as well as such an electric vehicle.

BACKGROUND

Electric vehicles having only at least one electric motor as the drive device, which is supplied with electric power by a battery as the electric energy storage device are an important field of research because of their low pollution emissions and additional advantages. Various driver assistance systems, which are supposed to support the driver while driving, have also been proposed for such electric vehicles. Examples of such driver assistance systems include longitudinal guidance systems, in particular ACC (adaptive cruise control) systems and speed-regulating (cruise control) systems. For such driver assistance systems, but also for other vehicle systems, information about the acceleration potential that will be available to the vehicle in the future may be useful, so that corresponding predictive acceleration information is generated and can be forwarded to the corresponding vehicle system in particular driver assistance system. Based on such acceleration information, operating parameters of the vehicle system can be adapted, in particular a future operating strategy and/or adjustable speeds, in particular maximum speeds. Thus, with longitudinal guidance systems, for example, it is conceivable to select the mode of operation in relation to a traffic participant driving in front and/or to switch to new extremely high speeds, depending on the available acceleration potential of the electric vehicle.

It is problematic here that there are also various influences outside of error states in electric vehicles which can cause the currently available acceleration potential to differ from the nominal acceleration potential which may correspond to the maximum power of the electric vehicle. If only nominal values are used in acceleration information, this can lead to unforeseeable driving performance of these driver assistance systems, which cannot be predicted and shows a wide range of scattering in automotive systems, in particular driver assistance systems. For example, set speeds, such as a desired speed and/or a new maximum allowed speed, can be regulated at different rates by driver assistance systems or may not be achieved at all. Another aspect that would make an improved predictive planning appear expedient is that energy can be saved by predictive driving operation and operational strategy, so that it may be possible to increase the range of electric vehicles in particular. Such a determination of a driving strategy that can be implemented by a longitudinal guidance system is described in DE 10 2011 116 184 A1, for example, wherein various items of information are used to implement the driving strategies but these items of information do not include a predicted acceleration potential.

DE 10 2011 116 773 A1 relates to a method and a device for longitudinal regulation of a vehicle during operation of the vehicle in a semiautomatic driving mode, wherein a distance limiting braking measure is carried out to maintain a predefinable minimum distance from a vehicle driving in front of one's vehicle. The method described there should be suitable in particular for use in an electric vehicle, since the electric motor can be switched to generator operation during deceleration, for example, for a person in front.

SUMMARY

The invention is based on the object of providing an option for situation-specific determination of a future acceleration potential of the electric vehicle, in particular for use as acceleration information in driver assistance systems.

To achieve this object, a method of the type defined in the introduction comprises the following steps according to the invention:

Providing power predictive information on the electric motor, which describes a predictive available acceleration power of the electric motor for at least one future period of time, Determining the acceleration information from the power predictive information using a vehicle model that supplies at least one vehicle parameter describing the prevailing operating state of the vehicle, at least one vehicle parameter describing the possible acceleration based on the acceleration power and/or in particular using predictive road data supplied by a navigation system for that period of time.

According to the invention, it has been recognized that there are a number of influencing factors which describe the acceleration potential for a future period of time, in particular a time that is directly imminent, for example, a certain number of seconds into the future but for which information is available or can be ascertained in a modern vehicle. For example, the available drive power (and therefore the available acceleration power) can be restricted by various conditions of the energy system and/or ambient conditions without the existence of a fault condition. Examples of such conditions include the outside temperature, the state of charge of the battery, the condition of the electronic power system and the like. Additional influencing factors relate to the fact that because of altered properties of the motor vehicle itself, for example, a weight that has been altered by an additional load as well as the section of road on which the vehicle is driving, there can be deviations from nominal values, in particular restrictions, for example, due to slopes, curves and/or a change in frictional performance. According to the invention, it is now proposed that this information—a prediction about the power of the electric motor, the vehicle model and predictive road data—should be combined to permit an accurate situation-specific calculation of a future acceleration potential of the electric vehicle.

The acceleration information can be used to particular advantage to control at least one driver assistance system, in particular a longitudinal guidance system of the motor vehicle, in particular for determining a predictive operating strategy of the driver assistance system. Thus, the acceleration information allows a more reliable prediction and thus early adjustment of operating strategies and/or operating parameters in general, to allow the most ideal possible, comfort-oriented operation of the respective driver assistance system that conforms to the needs of the driver. With regard to ACC systems as longitudinal guidance systems, for example, both acceleration and deceleration of a vehicle can be further optimized with regard to traffic participants driving in front, whereas it may be expedient with both an ACC system and a cruise control system to check on whether a set regulated speed can be achieved at all, and up to which value a speed set by the driver, for example, can be adjusted at all. This means that set speeds that cannot be achieved in particular can be blocked at an early point in time, so as to avoid a longitudinal guidance system performance that cannot be implemented. The information about the available future acceleration potential can also be analyzed for achieving the most energy efficient future driving operation possible by means of a driver assistance system, in particular a longitudinal guidance system.

According to the invention, this makes use of the fact that partial functions on which the proposed determination of predictive acceleration information is based have already been proposed in the prior art and/or can be implemented easily. This means that a novel combination of information inside the vehicle is proposed for determining the prevailing predictive acceleration information based on the given situation and supplying such information to the respective automotive systems, in particular driver assistance systems. Suitable models in particular are used as the basis for implementing the mapping of the acceleration power that can be made available in the electric motor with regard to possible changes in speed, such that overall physical relationships, which are fundamentally known to those skilled in the art, can be used, in particular also efficiencies and/or losses in the path of the electric motor for implementation of a movement with respect to the portion of road on which the vehicle is traveling.

A power prediction information of the electric motor is used here as the basis for determining the acceleration information such that corresponding procedures for predicating a power potential of the electric motor have already been proposed in the prior art and can also be used within the context of the present invention, optionally after being refined.

It is thus possible to provide that information about at least one instantaneous condition of the battery and/or the instantaneous status of energy information describing the battery and/or the electronic power system associated with the electric motor and/or information about the environment that describes the operating conditions of the electric motor and/or the battery and/or the electronic power system is/are used. The main factors that can result in a restriction of the power of the electric motor in particular are properties of the battery and the temperature conditions in the area of the electric motor and/or the energy system associated with the electric motor (the battery and the electronic power system) since the prevailing temperatures have a strong influence on the drive power actually available and thus also on the acceleration power. Consequently, an expedient refinement of the present invention provides that the energy information includes the charge status of the battery (SOC—state of charge) and/or the aging condition of the battery, and/or the information about the environment includes at least one temperature, in particular an outside temperature and/or a battery temperature, and/or an efficiency model that is parameterized by the energy information and/or the information about the environment includes the fact that the electric power stored in the battery is converted into a drive power and thus an acceleration power that can be utilized by the electric motor. In doing so, it may be particularly advantageous for the efficiency model to include a temperature model which describes the temperature influence on the energy system and the electric motor and in particular can also be parameterized mainly by the outside temperature since the heating processes that take place in the energy system and in the electric motor can themselves also be modeled over a period of time on the basis of the operation that actually takes place.

The result is power predictive information of a high quality which can also describe, for example, the available drive power for a certain period of time in general and/or can indicate that power for which period of time, for example, x seconds, a maximum instantaneous drive power can be maintained.

The vehicle model describes the condition of the vehicle as it is relevant for acceleration. It may be particularly advantageous to use a vehicle model that supplies at least one dynamic vehicle parameter and at least one static vehicle parameter. As is already apparent from the fundamental physical relationships, the speed and weight of the electric vehicle are the main influencing variables that can basically be influenced (the weight of the vehicle, for example, can be influenced by the added load) in converting acceleration power into a change in speed of the electric vehicle. Consequently, the prevailing vehicle weight and/or prevailing weight distribution and/or the prevailing and/or predicted speed of the vehicle can be used as vehicle parameters. The vehicle model may also include efficiencies in particular to permit a conversion of the drive power/acceleration power of the electric motor into a wheel power.

Curve information and/or slope information can preferably be used for predictive segment data describing a stretch of road ahead, wherein a potential longitudinal component of acceleration that increases the longitudinal speed of the vehicle is determined and/or a wheel slip is taken into account, in particular based on information about the condition of the road and/or coefficient of friction information for the predictive path data. For example, in the case of a slope on which the vehicle must drive, some of the acceleration power must be used to overcome the initial acceleration, so that only another portion of the acceleration of the vehicle actually supplied to the wheels can be used to increase the speed. Furthermore, in curves described by curvature information, the transverse acceleration component, which counteracts centrifugal force is not available for increasing the speed. Curve information and slope information can advantageously be retrieved from digital map data in a navigation system. Other predictive path data can also be obtained from the navigation system, wherein sensors, such as a camera directed at the field in front of the vehicle and the like, may also be used as sources for predictive path data as is fundamentally known in the prior art.

Another influencing factor that can be taken into account is the wheel slip and/or friction loss, i.e., effects in converting the torque of the wheel in relation to the substrate on which the wheel is traveling. Here again, corresponding models that can also be used within the scope of the present invention are known in the prior art. These may include, for example, information about the condition of the road and/or coefficient of friction information, for example, the type of substrate on which the vehicle is traveling and/or weather conditions.

In a particularly advantageous refinement of the invention, it is possible to provide that the predictive path data may comprise a predictive speed profile of the vehicle and/or a predictive speed profile of the vehicle may be determined from the predictive path data, wherein the predicted speed of the electric vehicle is used at a point in time during the period of time for determining the acceleration potential for this point in time. The determination of predictive speed profiles may in particular also take into account the operating data of a driver assistance system, in particular of a longitudinal guide system or the like which has already planned in advance a speed profile of the vehicle as part of an operating strategy, for example. Additional sources, which provide information about a future speed profile of the vehicle, includes the predictive path data per se, which may also contain, for example, information about allowed maximum speeds and/or other boundary conditions, such as sharp curves, which have an influence on speed. In determining a predictive speed profile, it is also possible in particular to use history data reflecting typical speed profiles such as those implemented by a driver in the past. Such speed profiles make it possible, for example, to provide predictive acceleration information such that it is possible to verify whether it will presumably be possible to accelerate to the new maximum speed at a position in the future where the maximum speed changes, so that this maximum speed can be used as the new set speed.

It should be pointed out here that the acceleration information describing the acceleration potential may optionally itself take into account possible acceleration processes in particular such that checks are performed for various points in time of the period of time being covered to ascertain the maximum speed up to which the vehicle can be accelerated and the like. For this purpose, a predictive period of time may be defined in addition to the period of time during which the maximum acceleration is evaluated.

It is fundamentally expedient if an acceleration profile describing the maximum possible acceleration over the period of time is determined as the acceleration information. A maximum possible acceleration can be described by acceleration values per se but it is also possible, as already indicated, to determine a maximum achievable speed by acceleration measures at a certain point in time which can be limited to a predictive period of time in order to rule out maximum speeds that can only be achieved asymptotically. The acceleration information may also indicate for points of time of the period of time how long at most a certain acceleration value can be maintained, in particular the maximum possible acceleration value at this point in time. In this way the acceleration information can ultimately be tailored to the following analysis, in particular on the part of a driver assistance system. It may also be expedient if at least one item of causal information is associated with the acceleration information for any deviation from a nominal acceleration potential. In taking the various effects into account in calculation of the acceleration information, it is possible to monitor which effect has the greatest influence on a restriction with respect to a nominal acceleration potential so that the corresponding information may be, for example, an extreme slope, an excessive temperature of the electric motor and/or of the energy system and the like.

In addition to this method, the invention also relates to an electric vehicle having an electric motor as the drive device, supplied with electric power from a battery and a control device designed for carrying out a method according to the invention. All the embodiments with respect to the method according to the invention can be scaled up similar to the electric vehicle according to the invention, with which it is consequently possible to also obtain the advantages already mentioned above. In particular the control device may include at least one control unit of the electric vehicle. For example, it is conceivable to determine the power predictive information on the part of an energy management control unit and/or motor control unit of the electric motor while another control unit, for example, a control unit of a central driver assistance system utilizes the power predicting information as the basis for determining the acceleration information, taking into account the vehicle model and the predictive path data.

BRIEF DESCRIPTION OF THE FIGURES

Additional advantages and details of the present invention are derived from the exemplary embodiments described below and also on the basis of the drawings, in which.

DETAILED DESCRIPTION

Figure 1:
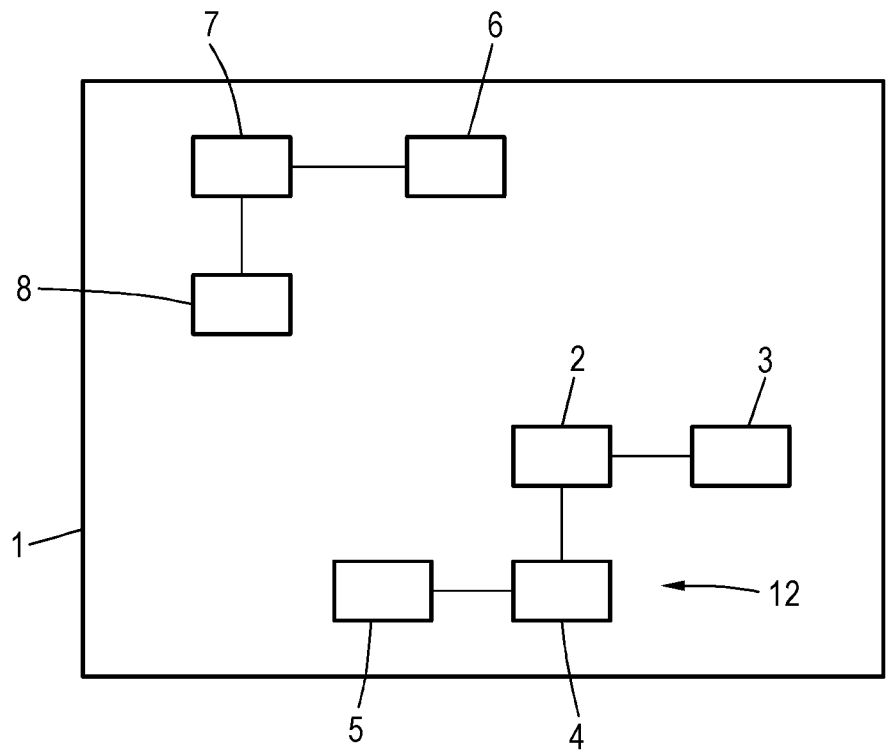
FIG. 1 shows a schematic diagram of an electric vehicle according to the invention and FIG. 2 shows a diagram to illustrate the method according to the invention.

FIG. 1 shows a schematic diagram of an electric vehicle 1 according to the invention, having an electric motor 2 as the drive device, whose drive power and thus optionally also acceleration power can be transmitted over the remaining drivetrain 3, which is merely indicated here, to the wheels of the vehicle 1 which are not shown in greater detail here. By using the corresponding electronic power system 4, the electric motor 2 is supplied with power from a high voltage battery 5.

Motor vehicle 1 also has a control device 6 which is designed for carrying out the method according to the invention and may comprise at least one control unit in particular an energy management control unit and/or a motor control unit and/or a control unit of a central drive assistance system. The control device 6 communicates with other vehicle systems, of which only a navigation system 7 and a driver assistance system 8 are shown here, merely as examples, the driver assistance system being designed as a longitudinal guidance system, in particular an ACC system or a cruise control system.

Figure 2:
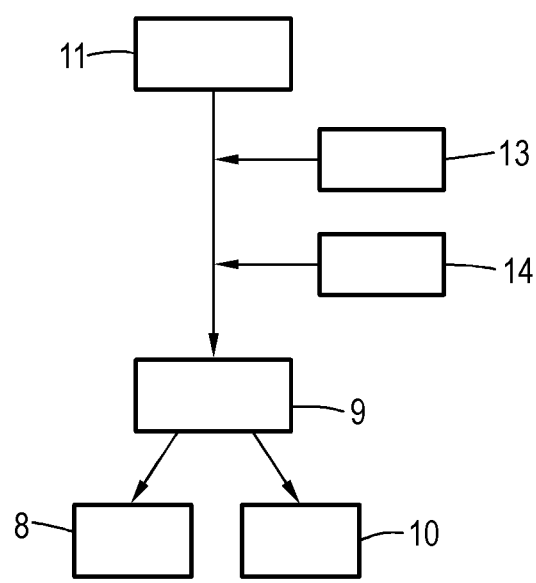

FIG. 2 shows a schematic diagram for carrying out the method according to the invention, which serves to determine predictive acceleration information 9 which can be supplied to the driver assistance system 8 and optionally other vehicle systems 10, in particular other driver assistance systems. This starts from power predictive information 11, which describes the predicted available acceleration power of the electric motor 2 for a future period of time, for example, for several seconds into the future. To determine the power predictive information, a check is ultimately performed to ascertain whether the maximum conceivable acceleration power that can be supplied by the electric motor 2 might be restricted by conditions of the energy system 12 (FIG. 1) itself or by the environment. To do so, the prevailing condition of the battery 5, in particular its state of charge, is described exactly like the outside temperature, the cooling conditions or the like, and may enter into a temperature model which describes the heating of the components of the energy system 12 and of the electric motor 2, which tracks the corresponding temperatures on the basis of the operation of the individual components. The temperature model is part of a general efficiency model, which describes the conversion of electric power from the battery 5 into drive power and thus also acceleration power by the electric motor 2.

This power predictive information 11 which can describe which maximum acceleration power can be made available for which period of time for various points in time of the period of time can basically be converted first into a wheel power on the wheels of the electric vehicle 1, if the instantaneous properties of the drivetrain 3 are known, which can be mapped according to another efficiency model. This wheel power is implemented by taking into account the wheel slip and/or friction losses in relation to the substrate on which the vehicle is driving.

The acceleration power of the electric motor 2 results in a change in the speed of the electric vehicle 1, which is the result based on physical principles. To do so, first the vehicle model 13 is used; this includes the vehicle speed as a dynamic vehicle parameter and the weight of the vehicle as a static vehicle parameter, wherein other vehicle properties can also be taken into account in a more detailed implementation and modeling. Furthermore, in order to be able to ascertain the acceleration information 9, this uses predictive path data 14, which is obtained in particular at least from the navigation system 7 and also contains slope information and curve information for the segment of road ahead of one's vehicle. The slope and the curve are essential for possible acceleration of the electric vehicle 1 because components which serve to provide compensation for acceleration due to earth's gravity and centrifugal force can be removed by calculation, given a knowledge of same.

In the present embodiment, the acceleration information 9 is determined as possible accelerations starting from a predictive speed profile at various points in time during the period of time. This means that for each point in time to be investigated within the period of time for which the acceleration information is to be predicted, a predictive speed of motor vehicle 1 is known, and it is possible to use the information shown, in particular the power predictive information 11, the vehicle model 13 and the predictive path data 14, to determine a maximum possible acceleration at this point in time, in exactly the same way as the maximum duration of same, which can be determined until reaching the maximum achievable speed of the electric vehicle 1, which may also be provided as part of the acceleration information 9 but can also be determined in the driver assistance system 8, for example, for blocking certain set speeds. Other or additional information is also conceivable as predictive acceleration information 9 and/or a portion thereof which describes the maximum possible acceleration of electric vehicle 1, for example, as an acceleration profile over the period of time to be predicted.

Corresponding acceleration information 9 can also be analyzed in the driver assistance system 8 and/or additional vehicle systems 10 for selecting suitable operating strategies, in particular also with regard to minimizing energy consumption and/or a predictable comfortable utilization of the driver assistance system.

The invention claimed is:

1. A method for determining a predicted acceleration information which describes a future acceleration potential of an electric vehicle having an electric motor as a drive device, which is supplied with electric power from a battery in the electric vehicle, comprising the following steps:
    providing power predictive information of the electric motor which describes a predicted available acceleration power of the electric motor for at least one future period of time, and
    determining the predicted acceleration information from the power predictive information by using a vehicle model which describes a possible acceleration based on at least one vehicle parameter and/or using predictive path data supplied by a navigation system for the at least one future period of time,
    wherein the at least one vehicle parameter comprises at least one of a current vehicle speed, a predicted vehicle speed, a vehicle weight, and a vehicle weight distribution,
    wherein, to determine the power predictive information, a parametric model evaluating an efficiency of the electric motor in converting electric power stored in the battery to acceleration power is used which considers an environmental temperature, a battery temperature, and a heating process of an electronics system comprising the electric motor and the battery due to operation over the at least one future period of time, and
    wherein the predicted acceleration information is used to control at least a longitudinal guidance system by blocking performance of the longitudinal guidance system to meet a set speed which is unachievable due to the predicted acceleration information.

2. The method according to claim 1, wherein the parametric model also considers a state of charge of the battery and an aging state of the battery.

3. The method according to claim 1, wherein the predictive path data describes curve information and/or slope information for a segment of road in front of the electric vehicle,
    wherein a potential longitudinal component of the acceleration, which increases a longitudinal speed of the electric vehicle, is determined and/or a wheel slip is taken into account, based in particular on road condition information and/or coefficient of friction information of the predictive path data.

4. The method according to claim 1, wherein the predictive path data includes a predictive speed profile of the electric vehicle and/or a predictive speed profile of the electric vehicle as determined from the predictive path data, wherein a predicted speed of the electric vehicle at a point in time within the at least one future period of time is used for determining the future acceleration potential for this point in time.

5. The method according to claim 1, wherein an acceleration profile describing a maximum possible acceleration over the period of time is determined as the predicted acceleration information and/or at least one item of information about the cause of a deviation from a nominal acceleration potential is associated with the predicted acceleration information.

6. The method according to claim 2, wherein the predictive path data describes curve information and/or slope information for a segment of road in front of the electric vehicle, wherein a potential longitudinal component of acceleration, which increases longitudinal speed of the electric vehicle, is determined and/or a wheel slip is taken into account, based in particular on road condition information and/or coefficient of friction information of the predictive path data.

* * * * *